United States Patent [19]

Gellert

[11] Patent Number: 5,366,369
[45] Date of Patent: Nov. 22, 1994

[54] INJECTION MOLDING INSERT HAVING AN ALIGNED PIN AND MELT INLET

[76] Inventor: Jobst U. Gellert, 7A Prince Street, Georgetown, Ontario, Canada, L7G 2X1

[21] Appl. No.: 96,934
[22] Filed: Jul. 26, 1993
[51] Int. Cl.⁵ ............................................. B29C 45/20
[52] U.S. Cl. ........................ 425/549; 264/328.15; 425/570
[58] Field of Search ............... 425/549, 568, 570, 572; 264/328.15

[56] References Cited

U.S. PATENT DOCUMENTS

| | | | |
|---|---|---|---|
| 3,940,224 | 2/1976 | Armour | 425/572 |
| 4,173,448 | 11/1979 | Rees et al. | 425/549 |
| 5,037,598 | 8/1991 | Akselrud | 425/549 |

FOREIGN PATENT DOCUMENTS 2047461 1/1993 Canada.

Primary Examiner—Tim Heitbrink
Attorney, Agent, or Firm—Dalesman & Company

[57] ABSTRACT

Injection molding apparatus with a number of spaced inserts removably seated in a heated melt distribution manifold. Each insert is seated in a transverse opening through the melt distribution manifold in alignment with a heated nozzle. The insert has a melt duct with a smoothly curved bend extending through 90° to an outlet in matching alignment with a melt bore extending centrally through the nozzle. The insert has an alignment pin which extends outwardly through a matching aperture in the melt distribution manifold into an opening in the mold to both align the insert in the manifold and locate the manifold in the mold. The alignment pin bore is positioned opposite from and in alignment with the inlet to the melt duct so alignment of the melt duct inlet in the insert with a respective branch of a melt passage in the manifold is very accurate.

5 Claims, 2 Drawing Sheets

INJECTION MOLDING INSERT HAVING AN ALIGNED PIN AND MELT INLET

BACKGROUND OF THE INVENTION

This invention relates generally to injection molding apparatus and more particularly to apparatus in which removable inserts seated in a melt distribution manifold are each accurately aligned by a pin extending outwardly in alignment with a melt duct inlet.

Multi-cavity injection molding systems having a heated melt distribution manifold are well known. The melt distribution manifold has a melt passage with a number of branches extending outwardly from a common inlet portion to convey melt to a number of spaced heated nozzles. The melt duct in each nozzle extends at 90° to the respective branch of the melt passage in the melt distribution manifold, and the flow of melt through each branch and nozzle must be balanced and sharp corners or edges which produce shear stress in the flowing melt are unacceptable. It is also known to provide removable inserts or plugs seated in transverse openings in the melt distribution manifold in alignment with the nozzles. Each insert has a melt duct with a smoothly curved bend extending through 90° from an inlet in alignment with the respective branch of the melt passage in the melt distribution manifold to an outlet in alignment with the melt duct through the respective nozzle. The melt duct inlet extends through a cylindrical portion of the outer surface of the insert and must be very accurately aligned with the respective branch of the melt passage in the melt distribution manifold to avoid unacceptable shear stress in the flowing melt.

As seen in Mold-Masters Limited Canadian Patent Application Serial Number 2,047,461 Laid-Open Jan. 20, 1993, entitled "Injection Molding Manifold with Removable Inserts", these previous inserts are aligned in the opening by a pin extending outwardly from a bore in a flange portion of the insert. The problem with these previous inserts is that it is extremely difficult to reliably align the melt duct inlet with the respective branch of the melt passage with sufficient accuracy to avoid producing shear stress in the flowing melt. The pin is received in a bore in the flange portion of the insert, and the difficulty is in drilling the bore in the required position with sufficient accuracy. Any resulting misalignment of the insert cannot be determined during installation, but after the system is operating a slight misalignment of any one of the inserts in the system produces product of unacceptable quality and requires a very costly shut down of the system. This problem has resulted in limited use of the previous inserts.

Also, in the past, various separate means have been required to accurately locate the melt distribution manifold with respect to the mold.

SUMMARY OF THE INVENTION

Accordingly, it is an object of the present invention to at least partially overcome the disadvantages of the prior art by providing an insert which considerably facilitates reliable accurate positioning of the alignment pin.

To this end, in one of its aspects, the invention provides multi-cavity injection molding apparatus having a plurality of spaced heated nozzles seated in a mold, each of the nozzles having a rear end extending in a common plane and a melt bore extending therethrough to convey melt to a gate leading to a cavity, a heated melt distribution manifold mounted to extend across the rear ends of the nozzles, the melt distribution manifold having a melt passage and a plurality of spaced transverse openings, each transverse opening aligned with one of the nozzles, the melt passage having a plurality of branches extending outwardly from a common inlet portion towards each of the nozzles, and a plurality of inserts each having a rear face, a front face, an outer surface, and a melt duct extending therethrough, each insert being removably seated in one of the transverse openings in the melt distribution manifold with the front face abutting against the rear end of a respective nozzle, the melt duct having a smoothly curved bend extending through substantially 90° from an inlet on the outer surface in matching alignment with one of the branches of the melt passage in the melt distribution manifold to an outlet on the front face in matching alignment with the melt bore through the respective nozzle, having the improvement wherein each insert has an alignment pin extending outwardly from the outer surface into a matching aperture in the melt distribution manifold to accurately align the inlet to the melt duct extending through the insert with said one of the branches of the melt passage in the melt distribution manifold, the alignment pin extending opposite from and in alignment with the inlet to the melt duct extending through the insert.

Further objects and advantages of the invention will appear from the following description taken together with the accompanying drawings.

DETAILED DESCRIPTION OF THE INVENTION

Figure 1:
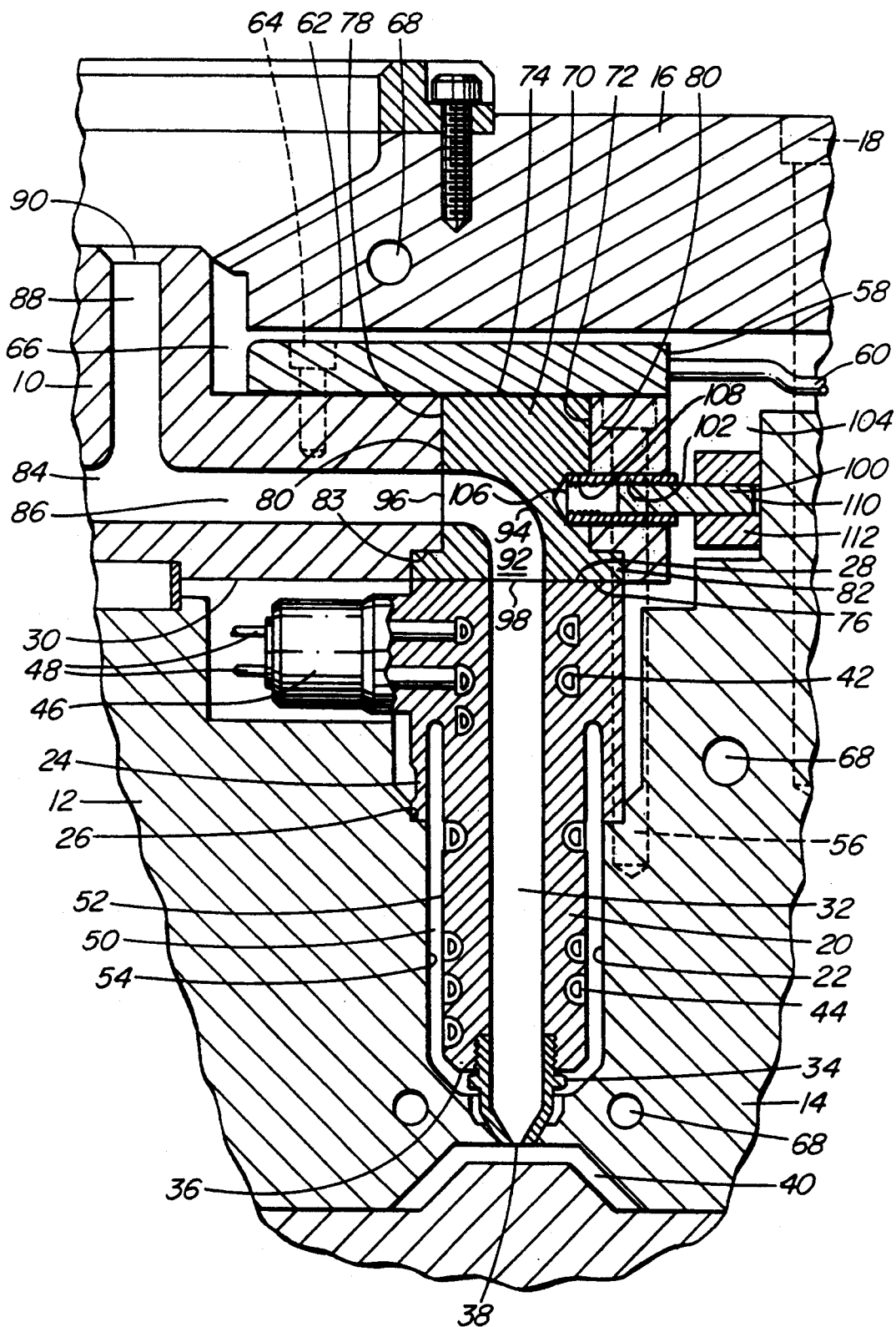
FIG. 1 is a sectional view of a portion of a multi-cavity injection molding system showing a melt distribution manifold having an insert according to a preferred embodiment of the invention.

Reference is first made to FIG. 1 which shows a portion of a multi-cavity injection molding system or apparatus having a steel melt distribution manifold 10 mounted in a mold 12 between a cavity plate 14 and a back plate 16 which are secured together by bolts 18. The mold 12 usually has a greater number of plates depending upon the application, but in this case only a cavity plate 14 and back plate 16 are shown for ease of illustration. This sprue gated injection molding system has a number of spaced heated nozzles 20, each of which is seated in a well 22 in the cavity plate 14 by a circumferential insulation flange 24 which sits on a circular shoulder 26. The nozzles 20 each have a rear end 28 extending in a common plane with the front face 30 of the melt distribution manifold 10. A central melt bore 32 extends through each nozzle 20 to a gate insert 34 mounted at the front end 36 of the nozzle 20 forming a gate 38 leading to a cavity 40. An electrical heating element 42 is integrally brazed in the nozzle 20 with a spiral portion 44 extending around the melt bore 32 and an external terminal 46 to provide connection to leads 48 from an external power source (not shown). An insulative air space 50 separates the outer surface 52 of the nozzle 20 from the surrounding inner surface 54 of the well 22.

The nozzles 20 and melt distribution manifold 10 are secured in place by bolts 56 which extend into the cavity plate 14. Electrical plate heaters 58 with power leads 60 are attached to the rear face 62 of the melt distribution manifold 10 by bolts 64. An insulative air space 66 is provided between the heated manifold 10 and the surrounding cavity plate 14 and back plate 16 which are cooled by pumping cooling water through cooling conduits 68.

The melt distribution manifold 10 extends across the rear ends 28 of the nozzles 20 and has a steel insert 70 removably seated in a transverse opening 72 through the manifold 10 in alignment with each of the nozzles 20. In this embodiment, each insert has a rear face 74 which is aligned with the rear face 62 of the manifold 10 and a front face 76 which is aligned with the front face 30 of the manifold 10 and abuts against the rear end 28 of the aligned nozzle 20. The outer surface 78 of each insert 70 has a cylindrical portion 80 which fits tightly in the transverse opening 72 to prevent melt leakage, and an outwardly extending flange portion 82 adjacent the front face 76 which seats against a matching circular shoulder 83 in the transverse opening 72 through the manifold 10.

As is well known, the heated melt distribution manifold 10 has a melt passage 84 with a number of branches 86 which extend outwardly towards each of the spaced nozzles 20 from a common inlet portion 88 extending rearwardly to a central inlet 90. As can be seen, the melt bore 32 in each nozzle 20 extends at 90° to the respective branch 86 of the melt passage 84 in the manifold 10, and the insert 70 is machined or cast with a melt duct 92 having a smoothly curved bend 94 extending through substantially 90° to convey melt between them. The curved melt duct 92 in each insert 70 has an inlet 96 on the cylindrical portion 80 of its outer surface 78 which matches and must be in exact alignment with the respective branch 86 of the melt passage 84 in the melt distribution manifold 10. The curved melt duct 92 in each insert 70 has a central outlet 98 on its front face 76 which similarly matches and at the processing temperature must be in exact alignment with the central melt bore 32 extending through the aligned nozzle 20.

The nozzle 20 is accurately located in the well 22 in the cavity plate 14 by the circumferential insulation flange 24, and the insert 70 is accurately located in the transverse opening 72 through the melt distribution manifold 10. Thus, it is relatively easy to ensure the central outlet 96 of the melt duct 92 is exactly aligned with the central melt bore 32 through the nozzle 20. However, accurate alignment of the melt duct inlet 96 on the cylindrical portion 80 of the outer surface 78 of the insert 70 with the respective branch 86 of the melt passage 84 in the manifold 10 is much more difficult to achieve. Thus, according to the invention, the insert 70 has an alignment pin 100 which extends outwardly from the cylindrical portion 80 of the outer surface 78 opposite from and in alignment with the melt duct inlet 96 into a matching aperture 102 in the melt distribution manifold 10. In this embodiment, the aperture 102 extends through the melt distribution manifold 10 and the alignment pin 100 extends through the aperture 102 into an opening 104 in the mold 12. The alignment pin 100 fits in the aperture 102 and, also referring to FIG. 2, has an inner end 106 which fits in an alignment pin bore 108 drilled inwardly from the cylindrical portion 80 of the outer surface 78 of the insert 70. Thus, the alignment pin 100 ensures the melt duct inlet 96 is exactly aligned with the matching branch 86 of the melt passage 84 in the manifold 10. Positioning of the alignment pin bore 106 with the required degree of accuracy is greatly facilitated by it being in alignment with the melt duct inlet 96. The alignment pin 100 has an outer end 110 which extends into the opening 104 in the mold 12 where it is secured by cam 112. This also accurately locates the melt distribution manifold 10 in the mold 12, while still allowing for thermal expansion of the heated manifold 10 relative to the cooled mold 12.

Figure 2:
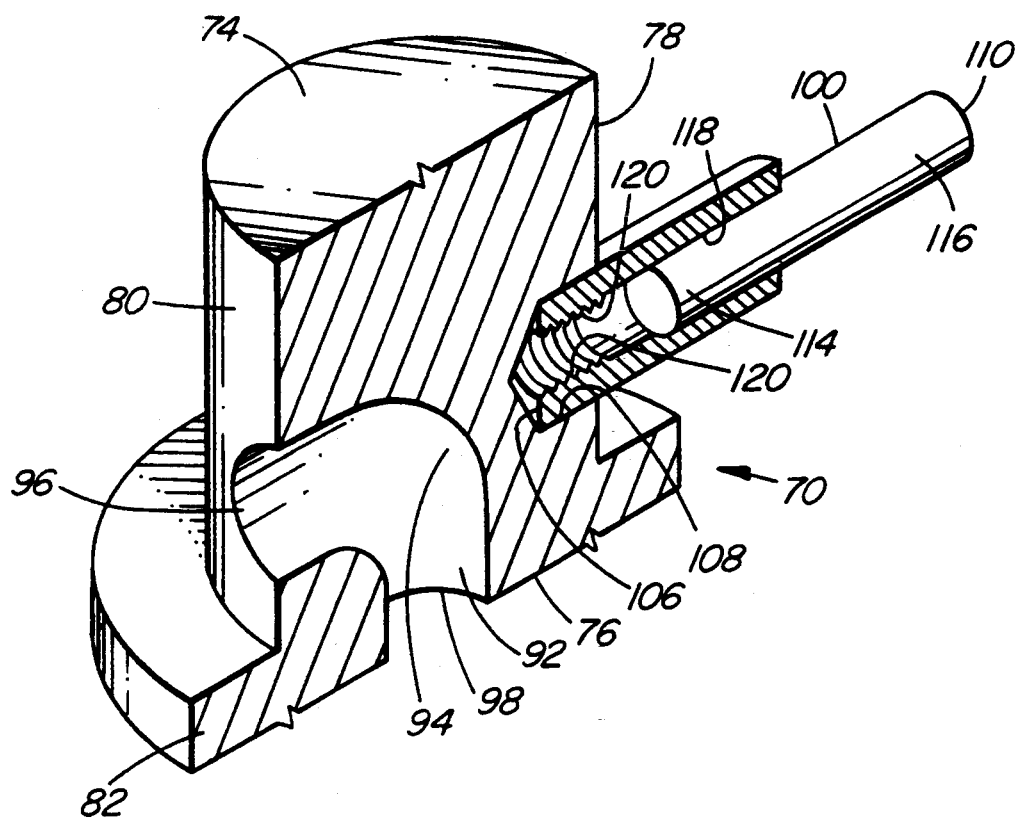
FIG. 2 is an isometric view of the insert seen in FIG. 1.

Although the alignment pin 100 can be a single piece, as best seen in FIG. 2, in this embodiment it has a first portion 114 and a separate smaller diameter second portion 116. The first portion extends outwardly from the alignment pin bore 108 in the insert 70 into the aperture 102 through the melt distribution manifold 10. The first portion 114 has a central bore 118 with an inner portion 120 which is threaded to receive a threaded tool to facilitate removal if necessary. The second portion 116 which extends outwardly into the opening 104 in the mold 12 has an inner end 122 which fits in the central bore 118 of the first portion 114.

In use, the system is assembled as shown with the inserts 70 seated in the respective transverse openings 72 in the melt distribution manifold 10. In order to obtain a fit tight enough to avoid melt leakage, the melt distribution manifold 10 can be heated prior to insertion of the inserts 70. After assembly, electrical power is applied to terminals 46 of the electrical heating elements 42 in the nozzles 20 and the leads 60 of the plate heaters 58 to heat the nozzles 20 and the melt distribution manifold 10 to a predetermined operating temperature. Pressurized melt is applied from a molding machine (not shown) to the central inlet 90 of the melt passage 84 according to a predetermined cycle. The melt flows through the inserts 70, nozzles 20, and gates 38 into the cavities 40. After the cavities 40 are filled and a suitable packing and cooling period has expired, the injection pressure is released. The mold 12 is then opened to eject the molded products. After ejection, the mold 12 is closed and the cycle is repeated continuously with a cycle time dependent upon the size of the cavities 40 and the type of material being molded.

While the description of the sprue gated injection molding system with removable inserts 70 seated in the melt distribution manifold 10 has been given with respect to preferred embodiments, it will be evident that various modifications are possible without departing from the scope of the invention as understood by those skilled in the art and defined in the following claims. It is apparent that the melt distribution manifold 10 can have numerous other configurations and that the removable inserts 70 and the alignment pins 100 can have other shapes and sizes. For instance, the melt distribution manifold 12 can be otherwise located, and the alignment pins 100 only extend from the inserts 70 into the aperture 102 in the manifold 10 and not through into the mold 12.

The embodiments of the invention in which an exclusive property or privilege is claimed are defined as follows:

1. In a multi-cavity injection molding apparatus having a plurality of spaced heated nozzles seated in a mold, each of the nozzles having a rear end extending in a common plane and a melt bore extending therethrough to convey melt to a gate leading to a cavity, a heated melt distribution manifold mounted to extend across the rear ends of the nozzles, the melt distribution manifold having a melt passage and a plurality of spaced transverse openings, each transverse opening aligned with one of the nozzles, the melt passage having a plurality of branches extending outwardly from a common inlet portion towards each of the nozzles, and a plurality of inserts each having a rear face, a front face, an outer surface, and a melt duct extending therethrough, each insert being removably seated in one of the transverse openings in the melt distribution manifold with the front face abutting against the rear end of a respective nozzle, the melt duct having a smoothly curved bend extending through substantially 90° from an inlet on the outer surface in matching alignment with one of the branches of the melt passage in the melt distribution manifold to an outlet on the front face in matching alignment with the melt bore through the respective nozzle, having the improvement wherein;

each insert has an alignment pin extending outwardly from the outer surface into a matching aperture in the melt distribution manifold to accurately align the inlet to the melt duct extending through the insert with said one of the branches of the melt passage in the melt distribution manifold, the alignment pin having an inner end which fits in an alignment pin bore extending inwardly from the outer surface of the insert opposite from and in alignment with the inlet to the melt duct extending through the insert.

2. Injection molding apparatus as claimed in claim 1 wherein the outer surface of each insert has a generally cylindrical portion and a flange portion extending outwardly from the cylindrical portion adjacent the front end to seat against a matching shoulder in the respective transverse opening in the melt distribution manifold.

3. Injection molding apparatus as claimed in claim 1 wherein the alignment pin extends through the matching aperture in the melt distribution manifold, and has an outer end which is received in an opening in the mold to also locate the melt distribution manifold in the mold.

4. Injection molding apparatus as claimed in claim 3 wherein the alignment pin comprises a first portion and a second portion, the first portion extending outwardly from the alignment pin bore in the insert and having a central bore, the second portion having an inner end which fits in the central bore in the first portion, the second portion extending from the central bore in the first portion outwardly into the opening in the mold.

5. Injection molding apparatus as claimed in claim 4 wherein the central bore of the first portion of the alignment pin has a threaded portion to receive a threaded removal tool.

* * * * *